Nov. 7, 1961 T. A. RICH 3,007,367
CONDENSATION NUCLEI DETECTOR
Filed Jan. 3, 1957 3 Sheets-Sheet 1

Fig.1

Inventor
Theodore A. Rich
by Morton D Moore
His Attorney

Fig.2

3,007,367
CONDENSATION NUCLEI DETECTOR
Theodore A. Rich, Scotia, N.Y., assignor to General
Electric Company, a corporation of New York
Filed Jan. 3, 1957, Ser. No. 632,347
11 Claims. (Cl. 88—14)

This invention relates to apparatus for measuring condensation nuclei, and more specifically those nuclei lying in a selected size range.

Condensation nuclei is a generic name given to small airborne particles which are characterized by the fact that they serve as the nuclei on which a fluid, such as water for example, will condense to form droplets. Such condensation nuclei encompass microscopic and submicroscopic particles ranging from $10^{-4}$ cm. radius to $10^{-8}$ cm. radius. Although, as this term is understood in the art, it encompasses the above mentioned range of sizes, the most significant portion, numerically, of the range extends from approximately $2.5 \times 10^{-7}$ cm. radius to $10^{-5}$ cm. radius.

Due to the minute size of these nuclei great difficulty is encountered in their detection and measurement since particles in the microscopic and submicroscopic range are involved. Hence, the usual techniques involving light absorption and light scattering are of no utility to measure the nuclei per se, since these nuclei are small relative to the wave length of visible light. As a result, techniques have been evolved which rely on their characteristic property of acting as the nucleus of a water drop. By causing the condensation of water about the nuclei their size is increased by many orders of magnitude so that available measuring techniques may be utilized.

The mechanism involved in the condensation of water vapor about such nuclei is dependent both on the instantaneous relative humidity and on the size of the nuclei. If the humidity of a gas or air mass tends to rise sufficiently above 100%; i.e., becomes supersaturated, as would occur by a sudden cooling of at least a portion of the mass, an unstable condition exists and condensation starts the deposition of water on the nuclei to achieve equilibrium conditions. The deposition of water on the nuclei continues until the humidity is lowered to a new equilibrium condition representing substantially 100% relative humidity for the new temperature. The relationship between relative humidity and particle size which controls the initiation of the condensation mechanism about all particles larger than a given critical size is shown in the following table:

| Critical size: | Relative humidity, percent |
|---|---|
| $10^{-7}$ cm. radius | 350 |
| $10^{-6}$ cm. radius | 112 |
| $10^{-5}$ cm. radius | 101 |
| $10^{-4}$ cm. radius | 100.1 |

The relationship between particle size and relative humidity disclosed in the above table illustrates quite forcibly that by controlling the degree of supersaturation present in a nuclei detecting instrument, it is possible to achieve sharp discrimination as to the portion of the size spectrum detected and measured.

Although condensation nuclei and their characteristics have been known for many decades, having been discovered almost 100 years ago, they have, until recent years, been considered merely as a scientific curiosity having no practical utility. Being thus scientific lore of a somewhat esoteric nature no critical need existed for accurate instruments to detect and measure these nuclei. As a consequence, for much of this period the only such instrument available was the Aitken Counter, named after one of the early researchers in this field.

In the recent past, extensive investigations have been carried out to determine the manner in which such condensation nuclei are produced as well as to discover practical applications for such particles. It has been found that an astonishing number of human activities, especially as exemplified by industrial processes, produce large quantities of condensation nuclei. Analysis of the condensation nuclei produced in the course of these processes provides very accurate and sensitive indices to the manner in which these processes function. Such indices have been found to be very useful in monitoring such industrial processes.

To illustrate in only a perfunctory fashion the great variety of industrial activities susceptible to this new technique one need only look at combustion processes of various types which are accompanied by the liberation of prodigious amounts of condensation nuclei.

Similarly, condensation nuclei are produced in astoundingly large quantities during photochemical conversion processes such as take place when sulphur dioxide ($SO_2$) is converted by sunlight to sulphur trioxide ($SO_3$). The significance of this latter process can be more fully appreciated if it is considered that the burning of coal, oil, and gasoline, all of which contain sulphur, produces large quantities of $SO_2$ which, in turn, may be converted by means of this photochemical action into condensation nuclei.

Chemical reactions of the type in which a gaseous carbonyl breaks down in the atmosphere are accompanied by the formation of large quantities of condensation nuclei.

Electrical arcing phenomena have also been found to produce copious quantities of condensation nuclei which are constituted of vaporized contact material.

In all of these examples, which are by no means comprehensive, the condensation nuclei may be utilized to provide a very accurate and sensitive gauge of the nature of the process as well as the manner in which it is proceeding.

However, in utilizing condensation nuclei analysis in monitoring such processes, it has been found that freshly generated nuclei most accurately reflect the conditions taking place. These virgin nuclei, however are primarily of $10^{-6}$ cm. radius and smaller. As the freshly generated nuclei age they combine or coagulate with other nuclei to form larger particles usually in the size range from $10^{-4}$ cm. radius to $10^{-6}$ cm. radius. Since condensation nuclei measuring devices indicate the total number of nuclei larger than a given size, it is important to eliminate the response or signal produced thereby due to the larger particles, which represent ambient background conditions, while accentuating the response to those smaller nuclei which are most significant as condition-indicating parameters. That is, it is desirable to have a high signal to noise ratio so that an instrument sensitive to small variations in the signal amplitude is provided.

It is an object of this invention, therefore, to provide apparatus for detecting and measuring condensation nuclei wherein indications due to background are substantially eliminated.

Another object of this invention is to provide apparatus for detecting and measuring condensation nuclei which achieves a high signal to noise ratio.

A further object of this invention is to provide an apparatus which detects and measures condensation nuclei in a selected size range.

Yet another object of this invention is to provide apparatus for detecting and measuring virgin condensation nuclei.

Other objects and advantages will appear as the description of the invention proceeds.

In accordance with the present invention the foregoing objects are accomplished by providing an apparatus wherein successive samples of a condensation nuclei bearing gaseous medium are subjected to differing degrees of adiabatic expansion. Thus, for successive samples different degrees of supersaturation occur and condensation takes place about nuclei lying in size ranges representing respectively the ambient population plus the virgin nuclei, as well as the virgin nuclei alone. The cloud of droplets produced by the condensation mechanism taking place for the successive samples is utilized to produce an electrical signal which is a measure of the number of particles detected. By continuously taking the difference of the two signals produced for the successive samples the background is substantially eliminated and only the number of particles lying in the particular size range representing the informative virgin nuclei is determined. Thus, the ultimate output signal represents the number of particles in the desired size range and even minute variations may be detected without being masked by the background nuclei population.

The novel features which are believed to be characteristic of this invention are set forth with particularity in the appended claims.. The invention itself, however, both as to its organization and method of operation, together with further objects and advantages thereof, may best be understood by reference to the following description taken in conjunction with the accompanying drawing in which:

In order to appreciate the full scope of the instant invention, both as to method and apparatus, and all of the consequences, articulated and implied, steming therefrom, it is important to understand the governing theoretical and empirical considerations. Hence, it is necessary to comprehend the size distribution of condensation nuclei and the role this fact plays in discriminating between those particles whose size indicates a past history and age of such a nature as is uninformative and the remaining particles which are extremely informative as a monitoring parameter.

Figure 1:
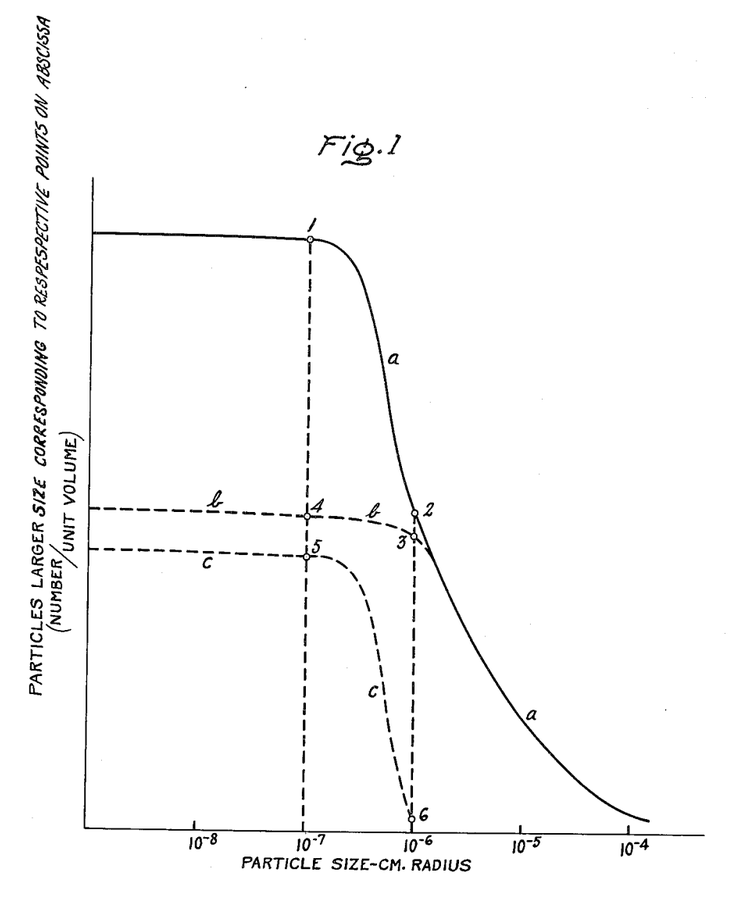
FIGURE 1 is a graph illustrating the relationship of signal to background.

Referring now to FIGURE 1 there is shown a graph which illustrates generally the distribution of the particle population by size in the vicinity of a nuclei generating source such as a monitored process. As has been pointed out previously, condensation nuclei detecting devices of the type referred to above do not measure particles of any given size, but measure all particles larger than a given critical size, that critical size being determined by the maximum degree of supersaturation achieved. As a consequence, any signals representative of the number of particles does not in any way provide information as to the distribution of sizes of the number of particles detected. Thus, it is impossible to tell what portion of the indication represents the informative virgin nuclei, and what portion represents the older particle population. FIGURE 1 represents, graphically, the approximate concentration of the particle population for different size particles. The ordinate of FIGURE 1 is plotted in number of particles larger than a given size and may be plotted in number per cubic centimeter. The abscissa is plotted in particle size in centimeter radius.

The curve $aa$ of FIGURE 1 illustrates the total particle population detected for any given degree of supersaturation and represents both the freshly formed condensation nuclei as well as the background or older particle population. The curve $bba$ represents the background particle population whereas the curve $cc$ represents the virgin nuclei the number or concentration of which it is the purpose of applicant's invention to indicate. The curve $aa$, of course, is the summation of the amplitude of the curves $bba$ and $cc$.

The curve $bb$ illustrates that the older or backgorund particles lie primarily in the size range from $10^{-6}$ cm. radius to $10^{-4}$ cm. radius. This is clear since the curve $bb$ is flat for all points corresponding to smaller nuclei. Curve $cc$, on the other hand, illustrates that the freshly formed nuclei, the quantity of which are to be measured, lie primarily in the range between $10^{-6}$ cm. radius and $10^{-7}$ cm. radius. This is clear for the same reason; i.e., the flatness of the curve for points corresponding to smaller nuclei.

Thus, for example, if a gaseous sample is subjected to an expansion which produces a sufficiently high degree of supersaturation to cause condensation about all particles larger than $10^{-7}$ cm. radius, a suitable, detector may produce an electrical output having a magnitude which indicates that the total number of particles per unit volume is that represented by the point 1 on the curve $aa$. The number of particles represented by the point 1 on the curve $aa$ is the summation of the background population, represented by the point 4 on the curve $bba$, and the virgin nuclei represented by the point 5 on the curve $cc$.

If, then, on the next successive sample the degree of supersaturation is changed to a lower degree so that condensation takes place on all particles larger than $10^{-6}$ cm. radius, the total particle population will be of a lesser value and is represented by the point 2 on the curve $aa$. This point again represents the sum of all particles present including both the virgin nuclei and the background particle population. As can be seen from the curves $bba$ and $cc$, however, at $10^{-6}$ cm. radius, most of the freshly formed nuclei are not being detected since substantially all of these virgin nuclei are smaller than this critical size. As a result, the magnitude of the point 2 on the curve $aa$ is due almost exclusively to the background particle population. If, then, these two values are subtracted, the difference in particle population for the two successive samples represents those particles lying in the size range between $10^{-6}$ cm. radius and $10^{-7}$ cm. radius. This range, as illustrated by the curve, encompasses substantially only the freshly formed condensation nuclei which are most informative in determining the status of the process generating them. As a result, the difference signal thus obtained is almost exclusively due to the signal representing the freshly formed nuclei, and any variation in the magnitude of this signal represents changes in the condition of the process forming said nuclei.

As a result, by alternately subjecting successive samples to different degrees of expansion and hence different degrees of supersaturation while continuously subtracting the indications obtained, it is possible to monitor very closely the change in virgin particle population per unit volume. As a result, this apparatus is extremely sensitive to even small variations in the particle population. Thus, even minute variations will be indicated rather than being masked by the magnitude of the older background population.

Figure 2:
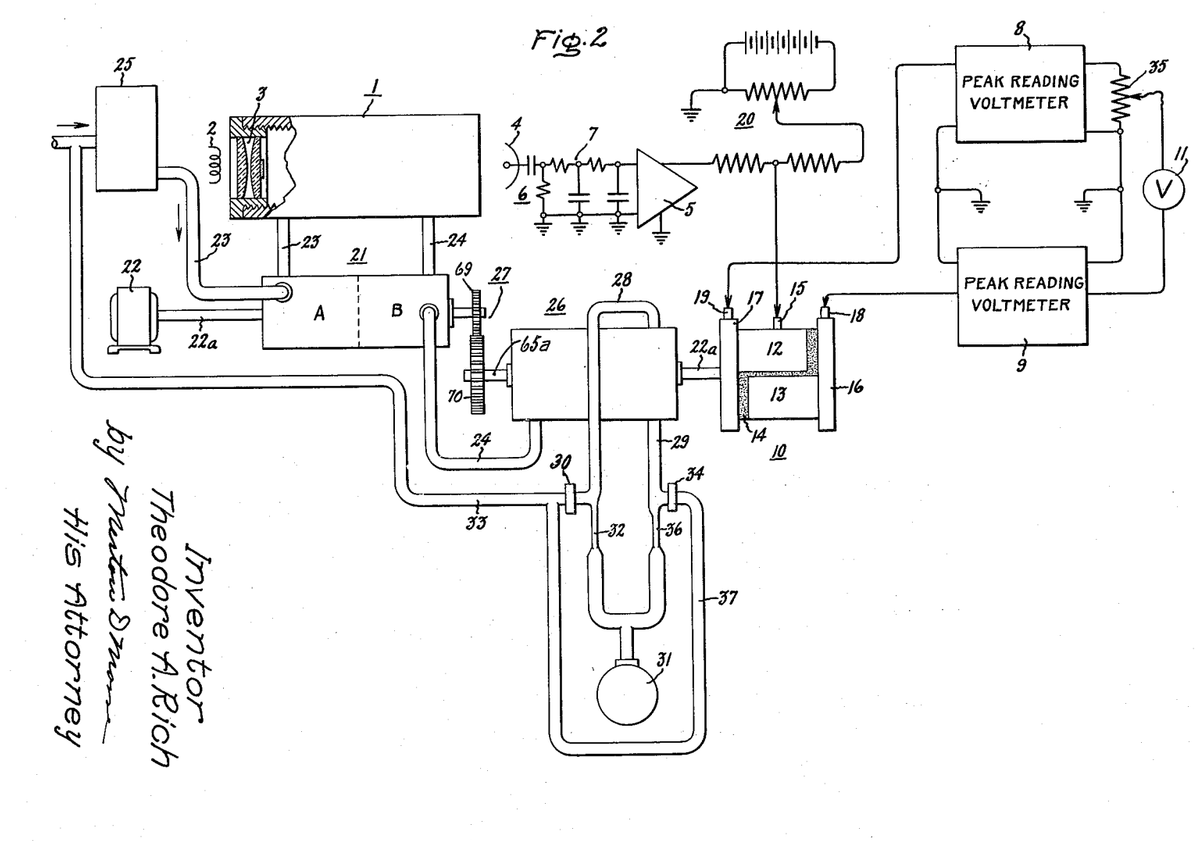
FIGURE 2 shows a view partially in cross section of the novel apparatus of the invention.

Referring now to FIGURE 2, there is shown a condensation nuclei detecting apparatus embodying the principles of the instant invention. There is provided an elongated expansion chamber 1 into which nuclei bearing gaseous samples, such as air for example, are periodically introduced and expanded in order to form droplet clouds. A beam of radiant energy is provided by an incandescent lamp 2, or any other similar source of radiant energy, positioned adjacent one end of the expansion chamber. This beam of radiant energy traverses the expansion chamber 1 by virtue of an optical system 3 mounted therein, shown in greater detail in FIGURE 3 and to be discussed later in connection therewith. A radiation sensitive device 4, such as a photoelectric cell or a photomultiplier device, is positioned adjacent to the other end of the expansion chamber 1 and intercepts any light scattered in the expansion chamber by the periodic formation of droplet clouds. The optical system within the chamber is so designed that no light falls on the radiation sensitive device 4 in the absence of a droplet cloud within the chamber. The precise manner in which this is achieved will be discussed in detail with reference to FIGURE 3. Only upon the occurrence of a cloud is light scattered and caused to impinge on the radiation sensitive device 4. Any scattered light falling on the radiation sensitive device 4 produces a periodic electrical signal the magnitude of which is a function of the number of condensation nuclei present.

The output of the radiation sensitive device 4 is connected to the input of an amplifying device such as an alternating current amplifier 5 through a resistance-capacitance coupling network 6 and a 120 cycle resistance-capacitance filter 7. The output of the amplifier 5 is alternately connected to a pair of peak reading voltmeters 8 and 9, indicated in block diagram form, through a synchronized commutating switch means 10. The peak reading voltmeters 8 and 9 are connected so as to produce a resulting signal which is their difference and is in turn connected to an indicating instrument 11 which may be a voltmeter or a strip chart recorder or any other similar instrument. The precise construction and manner of operation of the synchronized switch 10 and the peak reading voltmeters 8 and 9 will be described in greater detail later in conjunction with a description of the valving system of FIGURE 2.

Coupled to the expansion chamber 1 is a means to permit the periodic admission of nuclei bearing gaseous samples into the chamber and the subsequent expansion thereof. To this end, theer is provided a valve means 21 consisting of a first valve portion A and a second valve portion B. The valve means 21 is of the rotary type and may be most clearly seen with reference to FIGURES 3 and 4, and functions, broadly speaking, to control the periodic admission of gas samples into the chamber 1 and the subsequent expansion thereof to produce droplet clouds. The rotary valve means 21, as will be explained in greater detail later, consists of a bored cylindrical valve body and a rotor disposed therein driven by a motor 22 through a shaft 22a. The rotor of the valve means 21 has a number of recessed portions operative to perform the valving function. Rotary valve means A is connected to an input conduit 23 and periodically controls the introduction of gaseous samples into the chamber. The rotary valve means B is connected to an output conduit 24 and permits the periodic expansion of the gas samples in the chamber in order to form droplet clouds.

Also connected in the input conduit 23 is a humidifying element 25 which brings the samples to 100% relative humidity. The humidifier 25 may be one of many well known types and may be constituted of a sealed compartment having wicks dipped into a water container. Gaseous samples pass downward between the wicks on one side of a barrier, through a hole in the barrier, and back up the other side. In this fashion gaseous samples brought into the humidifier are brought up to 100% humidity.

Other types of humidifiers may, of course, be utilized. Thus, for example, the bubbler type of humidifier may be utilized wherein the gaseous samples are permitted to bubble through a reservoir of fluid and thus become humidified. It may also be desirable to position the humidifier 25 in close physical proximity to the expansion chamber 1 in order to avoid troublesome temperature differential between the humidifier and the expansion chamber.

Coupled to the output conduit 24 of the valve 21 is a means for subjecting successive samples to different degrees of expansion whereby different portions of the condensation nuclei size spectrum are detected. To this end there is provided a half-speed valve means 26. The valve means 26 is of the rotary type, as may be seen most clearly with reference to FIGURES 3 and 4, and functions to apply two sources of different lower pressure alternately to the chamber 1 through the valve 21. The rotary valve means 26, as will be explained in detail later, consists of a bored cylindrical valve body and a rotor driven by the motor 22, which also drives the rotor of the valve 21. The rotor of valve 26 is coupled to the driving motor 22 by means of a speed reducing gear arrangement 27 which drives the rotor of the valve 26 at one-half of the speed of the valve 21 thus causing the valve 21 to go through two operational cycles for every one of the valve 26. The valve 26 has two input conduits 28 and 29 and is so constructed that during one-half of its operating cycle the conduit 24 is connected to input conduit 28 while during the other half of the cycle it is connected to the input conduit 29. Since, as has been pointed out above, the valve 21 goes through two operational cycles for every one of the valve 26, the valve 21 will be alternately connected by valve 26 to the conduits 28 and 29 during successive operational cycles.

Coupled to the half-speed valve 26 are the input conduits 28 and 29 which, through the medium of the valves 26 and 21, apply two different degrees of expansion to successive samples of the gaseous medium within the chamber 1. The input conduit 28 is connected to a pump 31 through a control valve 30 and a water trap, not illustrated. The pump 31 provides a source of lower pressure which is controlled by means of the control valve 30 contained in the conduit 28; that is, valve 30 may be so adjusted that pressure in the conduit between pump 31 is maintained at a fixed difference in pressure from the atmospheric pressure in conduit 33. This lower pressure functions to expand the gas samples in the chamber 1 through the two valve means to the pressure determined by the control valve 30, thus providing a rapid pressure defined expansion.

Control valve 30 may be a valve of well known construction for the purpose. For example, a spring force may be balanced against the air pressure from the line 33, exerted against a washer or disc member. If the pressure produced by the pump is too low relative to atmosphere air flows into the pump line from conduit 33 and reduces the pressure differential across valve 30 to the pre-determined value.

In this fashion a constant differential is maintained and a fixed degree of expansion for given samples may be achieved. In utilizing pressure defined expansions it is necessary that a constant pressure differential be maintained in order to achieve the proper degree of expansion and supersaturation to cause condensation about nuclei in the proper size range. Since in this apparatus alternate samples are subjected to different degrees of expansion in order to detect nuclei in different portions of the size range, and the values are subtracted in order to determine the number of particles in a given portion of the size range, it is important to maintain accurately the pressure differential for the various samples.

The conduit 29 is similarly connected to the pump 31 through a control valve 34, and a restriction 36 to apply to the chamber 1, through the valve 26, a source of different lower pressure. An input line 37 connected to the control valve 34 permits air to bleed into the valve should the pressure produced by the pump be too low.

It is understood, of course, that the control valve 34 is pre-set in such a manner that the pressure applied to the valve 26 through the conduit 29 is of the different value than that to be found in the conduit 28.

Operated in synchronism with the valves 21 and 26 is a commutating switch means 10 which connects the output from alternating current amplifier 5 alternately to the peak reading voltmeters 8 or 9. Thus the periodic signal produced by the light sensitive device 4 for one degree of expansion is applied to one peak reading voltmeter while the periodic signal is applied to the other peak reading voltmeter for the other value of expansion. Thus, the one peak reading voltmeter provides a signal representative of the number of condensation nuclei in the size range representing background plus signal, whereas the other peak reading voltmeter represents all nuclei in a size range representing the background only. By subtracting these two signals, it is possible to achieve an indication on the voltmeter 11 of the number of particles lying in that size range representative of the virgin nuclei.

The peak reading voltmeters may be any one of those well known to those skilled in the art. Alternately, a peak reading voltmeter such as is disclosed in Serial Number 462,021 by T. A. Rich, filed October 13, 1954, now Patent No. 2,834,933, issued May 13, 1958, and assigned to General Electric Company, may be utilized with the instant apparatus.

The commutating switch 10 is driven by means of the common driving shaft 22a and comprises semi-cylindrical members 12 and 13 separated by means of insulation 14. The semi-cylindrical members 12 and 13 are connected respectively to a pair of slip rings 17 and 16 to provide a continuous electrical connection therewith. A pair of brush elements 18 and 19 are in permanent sliding contact with the slip rings 16 and 17 respectively. The brushes 18 and 19 are, in turn, connected respectively to the input of the peak voltmeters 9 and 8. A brush 15 is positioned in sliding contact with the cylindrical commutator segments 12 and 13. The brush 15 is, in turn, connected through a direct-current balancing circuit 20 to the output of the amplifier 5. Since the commutating switch 10 is driven by means of the drive shaft 22a, which also drives the valves 21 and 26, the output from the amplifier 5 is alternately connected to the peak reading voltmeters 8 and 9 for successive cycles of the valve 21. In this manner the electrical signal periodically produced by the radiation sensitive device 4 is alternatively applied to the respective peak reading voltmeters for successive samples of the gaseous medium subjected to expansion in the chamber 1.

The direct-current balancing circuit 20 connected in series between the output of the amplifier 5 and the commutating switch 10 is utilized to cancel out any signal which is due to the direct-current component of the plate current flowing through said amplifier. As a consequence, the indication produced in the output voltmeter 11 will be independent of any errors due to the direct-current component of the plate current in the direct-current amplifier 5.

The output signal from the peak voltmeter 8 is connected across a voltage divider 35 which has an adjustable tap connected to the voltmeter 11. In this fashion, sensitivity adjustments may be made depending on the ratio of expansion pressures applied to successive samples.

The operation of the apparatus of FIGURE 2 is such as to permit a precise and specified cycle of operation in which different degrees of expansion are applied to successive samples. The first sample to be tested enters the humidifier 25 where it is brought to 100% relative humidity at the temperature of the chamber. This occurs during a portion of the operational cycle of valve 21 denominated as the Flush portion. At this time rotary valve A is open and valve B is partially open so that the pump 31 can draw the gaseous medium completely through the system in order to remove the previous sample as well as introduce the new sample into the expansion chamber. The humidified air from the chamber 25 passes through the valve A into the expansion chamber 1. At this time the valve 26 is in the condition that, for example, a path exists therein between the input conduit 28 and the conduit 24. During the next portion of the cycle, known as the Fill portion, valve B closes stopping flow out of the expansion chamber 1. Valve A, however, is still open so that the gaseous medium continues to flow in until inlet pressure is reached.

The Dwell portion of the cycle then occurs in order to permit the gaseous sample in the chamber to reach an equilibrium condition. That is, valve A closes and valve B, which has been closed previously, remains closed allowing an overlap in the valves. During this Dwell portion of the cycle, the gas sample in the expansion chamber is permitted to reach equilibrium condition. Simultaneously, the valve 26 has reached a position wherein the conduit 28, which previously was in connecting relation with the conduit 24, is shut off. After the initiation of the Dwell portion of the cycle, the valve 26 remains in a closed position; i.e., neither the conduit 28 nor the conduit 29 being in connecting relation with the conduit 24. The valve 26 remains in this shut-off position for 30° of its operational cycle, and thus for 60° of one operational cycle, of the valve 21. The manner in which this overlap of the valve 26 occurs may be seen most clearly with reference to FIGURES 3, 5 and 8, and will be discussed in connection with those figures.

The next and final portion of the cycle is the Expand portion, during which the gas sample is permitted to undergo a pressure defined expansion in order to form a cloud of droplets about condensation nuclei, in a given size range present in the sample. Shortly before the start of the Expand part of the cycle, the valve 26 has rotated sufficiently to bring the conduit 29 into connecting relation with the conduit 24 thus connecting the pump 31 and a given low pressure thereto. At the start of the Expand part of the cycle, valve B opens fully and the pump 31 quickly pulls the chamber pressure down to that determined by the pump, the restriction 36, and the control valve 34.

The sudden adiabatic expansion cools the air in the chamber. The amount of water vapor in the air which was 100% of what could be retained at the former temperature (i.e., 100% relative humidity) will be more than 100% of what can be retained at the cooler temperature. The degree of supersaturation achieved will be directly related to the degree of expansion to which the sample is subjected and that in turn to the pressure differential between the pump 31 and the various control valves. Thus, a condition of supersaturation exists instantaneously within the chamber. As a result of this supersaturated condition, water vapor condenses on all condensation nuclei larger than a given critical size, the critical size being determined by the degree of supersaturation achieved within the chamber, to produce droplet clouds.

The light passing through the chamber 1 is scattered by the droplet cloud so that a portion of it reaches the radiation sensitive device 4 which is otherwise unilluminated. As a consequence, an electrical signal is produced in the output of the radiation sensitive device once per cycle. This electrical signal provides a measure of the number of nuclei present larger than the given critical size, since the amount of scattering of the light is dependent on the number of droplets formed within the chamber. This output signal is coupled by means of the commutating switch 10 to one of the peak reading voltmeters. For the sake of illustration let it be assumed that for an expansion ratio produced by the low pressure within conduit 29 and the control valve 34, the output of the amplifier 5 is applied to the peak reading voltmeter 8 since the brush 15 will then be in contact with the commutating segment 12 and, in turn, to the slip ring 17 and its associated brush 19.

At the end of the Expand cycle, and the initiation of the next operational cycle, valve A reopens to initiate the Flush portion of the next cycle permitting complete removal of the previous sample. The pressure in the chamber goes back up and, consequently, the air temperature therein rises and the droplets evaporate. Valve B is now only partially open and valve A is completely open so that the Flush portion of the cycle is initiated. At this time the conduit 29 is still in communication with the conduit 24 through the valve 26 and the pump pulls the sample out of the chamber 1. As described previously the pump 31, in addition, draws a new sample into the expansion chamber 1.

The Dwell portion of the second operational cycle is then initiated with the closing of the valve B stopping flow out of the expansion chamber 1, while still permitting air to flow into the chamber through the valve A until inlet pressure is reached.

At this point the initiation of the Dwell portion of the cycle, the valve 26 has reached the position which interrupts communication between the conduit 29 and the conduit 24. As pointed out previously, a period of overlap exists in the valve 26 wherein neither conduit 28 nor conduit 29 is in communicaton with conduit 24, with this period extending for 30° of the valve 26 cycle and for 60° of the cycle of the valve 21. At the end of this cycle, and before the initiation of the Expand portion for this second sample, the valve 26 reaches the position wherein the conduit 28 comes into communication with the conduit 24 and applies thereto a source of lower pressure represented by the pump 31, the restriction 32 and the control valve 30. Shortly after the occurrence of this action the Expand portion of the cycle begins and the valve B opens, subjecting the sample in the chamber 1 to a pressure defined expansion, the pressure defined expansion being a different one from that for the previous sample due to a different low pressure originated by valve 30. Again, a cloud of droplets will be formed within the chamber by the condensation of water about any condensation nuclei greater than a critical size. The critical size for condensation for this sample, however, is different from that for the previous sample since the degree of expansion to which the sample is subjected is different from that for the previous one. The light passing through the chamber 1 is again scattered by the droplet cloud produced so that the radiation sensitive device 4 produces an electrical signal, the magnitude of which is proportional to the number of particles greater than the critical size.

The signal produced by the radiation sensitive device 4 is amplified in the amplifier 5 and applied through the commutating switch 10 to the peak voltmeter 9. That is, the switch 10 has rotated sufficiently so that the commutator section 13 is now in contact with the brush member 15, and the input of the peak voltmeter 9 is connected through the slip ring 16 and its associated brush 18 to the output of the amplifier 5.

At the end of the Expand cycle, another operational cycle for the valve 21 is initiated and a new sample of the gaseous medium is introduced into the chamber 1 and subjected to the above described sequence of events. Thus, successive samples are subjected alternately to different degrees of expansion by virtue of the fact that the conduits 28 and 29 are alternately connected to the chamber 1 through the valve 26 and the valve 21. Since different portions of the size spectrum of the nuclei are detected for the different degrees of expansion, it is possible by subtracting the readings obtained to determine the number of particles lying in a particular size range. That is, if the degree of expansion applied to the gaseous samples in the chamber by means of the conduit 28 and the associated valves is such that all particles larger than $10^{-7}$ cm. radius are detected, and the expansion applied to conduit 29 and the associated valves is such as to detect all particles larger than $10^{-6}$ cm. radius, by subtracting the two values it is possible to determine how many particles are present in the range between $10^{-6}$ cm. radius and $10^{-7}$ cm. radius.

Thus a voltmeter, such as illustrated at 11 in FIGURE 2 connected between the peak reading voltmeters 8 and 9, produces an indication of the number of particles lying in such a size range and any variation in that indication indicates a change in the population of particles lying in this particular size range. In this fashion, it is possible to determine the behavior of the particle population lying in a critical size range which may be extremely informative as to the nature of a process which is producing these nuclei.

By thus continually subtracting a signal representing both the background population as well as the signal population and a electrical signal representing only the background particle population, an indication is achieved of the number of particles representing substantially only the signal particles.

As was pointed out with reference to FIGURE 2, the expansion chamber, in conjunction with the two rotary valve means, constitutes the overall means by which samples of gaseous mediums are periodically drawn into the apparatus and caused to undergo different degrees of expansion for successive samples.

Figures 3, 4, 5, 6, 7, 8, 9:
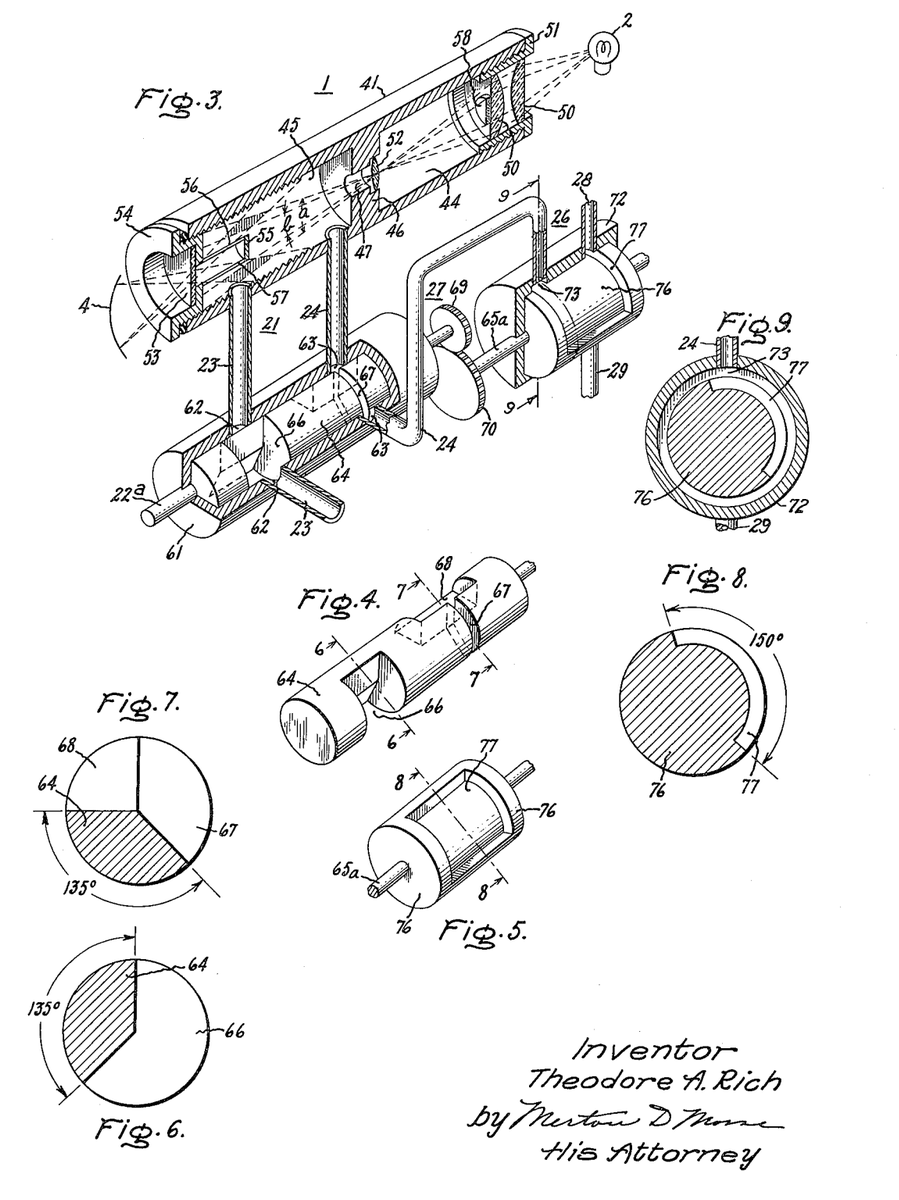
FIGURE 3 is a fragmental perspective, partially in cross section, of the expansion chamber and the valving system of FIGURE 2.
FIGURE 4 is a perspective view of one of the valve rotors of FIGURE 3.
FIGURE 5 is a perspective view of another valve rotor of FIGURE 3.
FIGURE 6 is a sectional view of the valve rotor taken along the line 6—6 of FIGURE 4.
FIGURE 7 is another sectional view of the valve rotor taken along the line 7—7 of FIGURE 4.
FIGURE 8 is a sectional view of the valve rotor taken along the line 8—8 of FIGURE 5.
FIGURE 9 is a sectional view of the valve assembly 26 taken along the line 9—9 of FIGURE 3.

FIGURE 3 illustrates, in detail, a preferred embodiment of an expansion chamber 1 and rotary valve means 21 and 26 which may be utilized in conjunction with the apparatus of FIGURE 2. There is provided a cylindrical chamber 41 having a source of radiant energy, such as the incandescent lamp 2, positioned adjacent to one end thereof. Mounted in juxtaposition with the other end of the chamber 41 is a radiation sensitive device 4 of the type disclosed and described with reference to FIGURE 2. The chamber 41 consists of two chamber portions 44 and 45 separated by means of a divider wall 46 having an elongated cylindrical passageway 47 extending therethrough. The chamber portion 45 comprises the cloud forming chamber wherein the gaseous samples are expanded to form droplet clouds. An input conduit 23 and an output conduit 24 are provided for admitting the gaseous samples and for subjecting them to expansion by means of the half-speed valve and pump illustrated in FIGURE 2.

Mounted within the chamber 41 is an optical system which functions to project the beam of radiant energy through the chamber in such a manner that light falls on the radiation sensitive device only if a droplet cloud is present in the cloud chamber 45. A pair of condensing lenses 50 are positioned at the end of the chamber 41 adjacent to the incandescent lamp and are positioned with a threaded lens mount 51. The condensing lenses 50 function to focus the beam of light and make an image thereof at the dividing barrier 46. A divider lens 52 is mounted on the wall 46 at the entrance of the passageway 47 and projects the beam of light focussed thereon through the passageway 47 and into the cloud forming chamber 45. Inasmuch as the light from the source 2 is focussed at the divider lens 52, the lens acts effectively like a source positioned at this point of the chamber. Thus, there is produced within the cloud chamber 45 a cone of light subtending an angle "$a$" and illustrated as such in FIGURE 3.

Positioned at the other end of the chamber 41 and adjacent to the radiation sensitive device 4 is a transparent window element 53 positioned within a threaded mounting 54 directly in front of the radiation sensitive device 4. To insure that only light scattered by droplets within the cloud chamber 45 impinge upon the radiation sensitive device 4, an opaque light barrier 55 of circular configuration is positioned in front of the window 53 to block the direct light path from the divider lens 52. The light barrier 55 is fastened to the mounting 54 by means of the struts 56 and 57.

The interior surface of the cloud chamber 45 in the vicinity of the window 53 is threaded in order to prevent stray light due to multiple reflections of the incoming ray from impinging on the radiation sensitive device. That is, the threaded portion of the chamber will cause multiple reflections of such stray light and cause it to be absorbed thereby. Additionally, the end of the chamber 45 may be painted black or covered with black velvet in order to minimize further any stray reflected light.

In order to avoid the possibility that any directly projected light strike the edge of the barrier 55 and be diffracted toward the window 53 to produce an inaccurate reading, it is desirable to provide a cone of darkness subtending an angle "b" within the cone of light subtending the angle "a." The angle "b" of the cone of darkness is of sufficient magnitude so that the edge of the light barrier 55 is unilluminated. To this end, there is provided an opaque circular disc 58 positioned on the face of one of the condensing lenses 50 within the chamber 44. In this fashion there is produced a cone of darkness within the cone of light. As a result, only the light in the angular volume which is illuminated by rays in the cone of light and in the sight of the radiation sensitive device is effective for producing a scattered light signal. This angular volume is illustrated in FIGURE 2 by means of the dotted portion. It can be seen that as a result of this construction the radiation sensitive device 4 intercepts a substantial portion of all the light scattered by the droplet clouds in the forward direction. In this way a very sensitive means is provided for measuring the number of droplets within the cloud forming chamber 45.

A rotary valve means 21 is provided in order to control the admission of gaseous samples into the cloud forming chamber 45 and the subsequent expansion of the samples. The valve means 21 comprises a valve body 61 having a cylindrical bored portion therein. The input conduit 23 extends through the valve body 61 to form a first pair of ports 62 extending into the bore and positioned at an angle of 90° with respect to each other. The output conduit 24 similarly extends through the valve body 61 into the bore to provide a second pair of ports 63 positioned at right angles to each other. Positioned within the cylindrical bore of the valve body 61 is a rotary cylindrical member 64 fastened to a shaft 22a driven by a motor such as illustrated in FIGURE 2.

FIGURE 4 illustrates the rotor 64 which has circumferentially extending recessed portions alignable with the respective pair of ports upon rotation of the rotor 64. A first recessed portion 66 provides communication between the ports 62 when in alignment therewith and permits the flow of gaseous samples into the cloud chamber 45 through the input conduit 23. The recessed portion 66 is of substantial width and, in a preferred embodiment, subtends an angle of approximately 225°, as may be seen most clearly in FIGURE 6 which is a section taken along the line 6—6 of FIGURE 4.

Axially displaced from the recessed portion 66 is a second recessed portion controlling flow through the output conduit 24 and which permits the periodic expansion of the cloud samples within the cloud chamber 45. This second recessed portion consists of a relatively wide circumferentially extending recessed portion 68 and a relatively narrow circumferentially extending slotted section 67 in communication therewith. As may be seen in FIGURE 4, the wide recessed portion 68, in a preferred embodiment, extends for an angle of approximately 90° whereas the narrow slot portion 67 extends for approximately 135°. The recessed portions 66, 67 and 68 are so positioned around the circumference of the rotor body 64 that they are simultaneously in alignment with their respective ports 62 and 63 during one portion of the cycle and out of alignment during another.

In addition, there is provided a speed-reducing gear arrangement 27 comprising a driving gear 69 connected to the shaft 22a and a driven gear 70 connected to a driven shaft 65a. The speed-reducing arrangement 27 functions to drive a second half-speed valve 26 in such a manner that the valve 26 goes through one rotation for every two rotations of the valve 21. The output conduit 24 from the valve 21 is connected to the half-speed valve 26 and constitutes the output conduit thereof. The rotary valve means 26 alternately connects two sources of lower pressure to the expansion chamber 45 so that successive samples of the gaseous medium may be subjected to two different controlled degrees of expansion.

The valve means 26 consists of a valve body 72 having a cylindrical bored portion therein. The output conduit 24 from the valve 21 extends through the valve body or stator 72 and communicates with a circumferentially extending slotted portion 73 in the valve body, as may be seen most clearly in FIGURE 9. A pair of input conduits 28 and 29, axially spaced from the conduit 24 and positioned at an angle of 180° to each other, similarly extend through the valve body 72 and communicate with the bored portion thereof. The conduits 28 and 29 are connected, as illustrated in FIGURE 2, to two sources of different lower pressure which are alternately connected to the output conduit 24 by means of a recessed rotor member and, consequently, to the expansion chamber 1.

Positioned within the cylindrical bore of the valve body 72 is a rotary member 76 fastened to the driven shaft 65a and driven from the gear reducing means 27. The rotor 76 has a circumferentially extending recessed portion which is alternately alignable with the input conduits 28 and 29 and the output conduit 24. The recessed portion 77 permits communication between the conduit 28 and the conduit 24 during approximately one-half of the operational cycle of the valve 26, and permits communication between the conduit 29 and conduit 24 through the slotted portion 73 during approximately the remaining half of the operational cycle. The recessed portion 77 is of substantial width and, in a preferred embodiment, subtends an angle of approximately 150°, as may be seen most clearly in FIGURES 5 and 8, the latter being a section taken along the line 8—8 of FIGURE 5.

It is obvious from the construction of this valve that since the recessed portion 77 subtends an angle of approximately 150°, that the input conduits 28 and 29 will be in communication with the output conduit 24 for 150° respectively, and that there will be two periods in each rotational cycle, each of 30° duration, during which neither the conduit 28 nor the conduit 29 is in communication with the output conduit 24.

Since, as has been pointed out previously, the valve 21 goes through two operational cycles for every single cycle of the valve 26, it can be seen that for approximately one operational cycle of the valve 21, the conduit 28 is in communication with the output conduit 24, while during the next successive operational cycle of valve 21 the conduit 29 is communicating with the output conduit 24. In this fashion for successive cycles of the valve 21 different degrees of expansion from the sources of lower pressure are applied to the expansion chamber 1.

The relative position of the valve rotors with respect to their conduits are so arranged that valve 21 has one source of low pressure coupled thereto through 300° of its operational cycle while during the remaining 60° thereof no source of pressure is applied thereto. During the next succeeding operational cycle of the valve 21 another source of lower pressure is applied thereto for 300° of that cycle while during the remaining 60° thereof the source of pressure is removed. The valve rotors are so arranged that the valve 26 closes and no pressure is applied to the valve 21 and the chamber 1 at the beginning of the Dwell period. Shortly before the beginning of the Expand period the valve 26 has moved to a position where either the conduit 28 or the conduit 29 is in communication with the conduit 24. This communication continues until the valve 21 goes through one complete operational cycle and begins the Dwell period for the next sample. At this time the valve 26 has moved to the position where both conduits 28 and 29 are out of alignment with the conduit 24. Before the beginning of the next Expand portion the valve 26 moves into position so that the other of the input conduits is now in communication with the conduit 24 and applies a different degree of lower pressure and expansion to the sample in the chamber 1. In the following table the relative positions of the various recessed portions and their associated conduits of the valves 21 and 26 are illustrated for one complete operational cycle of the valve 26 and, consequently, two operational cycles of the valve 21.

|  | Valve 21 | | Valve 26 |
|---|---|---|---|
|  | A | B |  |
| Flush₁ | Open | Open | Open |
|  | Slot 66 in alignment with conduit 23. | Slot 67 in alignment with conduit 24. | Slot 77 in alignment with conconduits 24 and 28. |
| Fill₁ | Open | Closed | Open |
|  | Slot 66 in alignment with conduit 23. | Slots 68 and 67 out of alignment with conduit 24. | Slot 77 in alignment with conduits 24 and 28. |
| Dwell₁ | Closed | Closed | Closed |
|  | Slot 66 out of alignment with conduit 23. | Slots 68 and 67 out of alignment with conduit 24. | Slot 77 out of alignment with all conduits. |
|  |  |  | Open |
|  |  |  | Slot 77 comes into alignment with conduits 29 and 24 before the initiation of Expand period of valve 21. |
| Expand₁ | Closed | Open | Open |
|  | Slot 66 out of alignment with conduit 23. | Slots 67 and 68 in alignment with conduit 24. | Slot 77 in alignment with conduits 24 and 29. |
| Flush₂ | Open | Open | Open |
|  | Slot 66 in alignment with conduit 23. | Slot 67 in alignment with conduit 24. | Slot 77 in alignment with conduits 24 and 29. |
| Fill₂ | Open | Closed | Open |
|  | Slot 66 in alignment with conduit 23. | Slots 68 and 67 out of alignment with conduit 24. | Slot 77 in alignment with conduits 24 and 29. |
| Dwell₂ | Closed | Closed | Closed |
|  | Slot 66 out of alignment with conduit 23. | Slots 68 and 67 out of alignment with conduit 24. | Slot 77 out of alignment with all conduits. |
|  |  |  | Open |
|  |  |  | Slot 77 in alignment with conduits 24 and 28 30° before initiation Expand₂ period of valve 21. |
| Expand₂ | Closed | Open | Open |
|  | Slot 66 out of alignment with conduit 23. | Slots 67 and 68 in alignment with conduit 24. | Slot 77 in alignment with conduits 24 and 28. |

As is clearly illustrated in the above table, the valve 26 is actuated in such a manner as to apply alternate degrees of expansion to the chamber 1 through the valve 21. In this fashion successive samples of the gaseous medium applied to the chamber 1 are subjected to different degrees of expansion and, consequently, condensation nuclei lying in different size portions of the size spectrum are detected.

The shaft 65a driving the rotor of the valve 26 is also coupled to the commutator switch 10, not shown in this figure, which alternately connects the output from the radiation sensitive device to one or other of the peak reading voltmeters. In this manner the switch is driven in synchronism with the two valves so as to switch the output from one to the other of the peak voltmeters as the degree of expansion is changed for successive samples.

From the foregoing description, it can be appreciated that the invention provides an apparatus of high order of accuracy in detecting even minute variations of the particle population lying in that critical size range which is most informative as to the nature of the process generating these particles.

While a particular embodiment of this invention has been shown it will, of course, be understood that it is not limited thereto since many modifications both in the arrangement and in the instrumentalities employed may be made. It is contemplated by the appended claims to cover any such modifications as fall within the true spirit and scope of this invention.

What I claim as new and desire to secure by Letters Patent of the United States is:

1. In a continuous size selective condensation nuclei detecting apparatus, the combination comprising a chamber means adapted to hold nuclei bearing gaseous samples under pressure, first valve means coupled to said chamber means to introduce samples into said chamber periodically, means coupled to said first valve means for expanding successive samples by different degrees of expansion including a first source of lower pressure, a second source of different lower pressure, second valve means coupled between said sources and said first valve means to couple said first and second sources alternately to said chamber, means operatively associated with said chamber means to measure the density of fog produced for each pressure, and means coupled to said last named means to indicate the difference in densities as an index of the nuclei concentration in the desired size range.

2. In a condensation nuclei detecting apparatus for determining the nuclei concentration in a predetermined range of sizes, the combination comprising a chamber means adapted to hold nuclei bearing gaseous samples under pressure, first valve means coupled to said chamber means to introduce samples into said chamber periodically, means coupled to said chamber means to expand said samples including second valve means to couple low pressure means to said chamber, said low pressure means including a first source of lower pressure, and a second source of different lower pressure, third valve means coupled between said sources and second valve means to couple said first and second sources alternately to said second valve means, and means operatively associated with said chamber means for producing electrical outputs proportional to the density of the fog produced in the individual samples, and circuit means coupled to said last named means for measuring the difference in the density of the fog for samples subjected to alternate pressures.

3. In a condensation nuclei detecting apparatus, the combination comprising a chamber means adapted to hold nuclei bearing gaseous samples under pressure, first rotary valve means coupled to said chamber means to introduce samples into said chamber and expand them periodically, first and second sources of lower pressure, a second rotary valve means coupled to said first valve means and rotating at one-half the speed thereof to couple said first and second sources alternately to said first valve means, common driving means for said first and second valve means, and a means operatively associated with said chamber means for producing an electrical output, said electrical output being proportional to the difference in density of the fog produced for alternate pressures.

4. In a condensation nuclei detecting apparatus, the combination comprising a chamber means adapted to hold nuclei bearing gaseous samples under pressure, first rotary valve means coupled to said chamber means to introduce samples into said chamber and expand them periodically, first and second sources of different lower pressure, a second rotary valve means coupled between said sources and said first valve means to connect said first and second sources alternately to said first valve means, common driving means for said first and second valve means including speed reducing means to drive said second valve means at half the speed of said first valve means, and means operatively associated with said chamber means for producing an electrical output proportional to the difference in density of the fog produced in said chamber for alternate pressures.

5. In a condensation nuclei detecting apparatus for determining nuclei concentration in a predetermined range of sizes, the combination comprising a chamber adapted to hold nuclei bearing gaseous samples under pressure, first rotary valve means coupled to said chamber to introduce and expand samples periodically in said chamber, first and second sources of different lower pressure, a second rotary valve means coupled between said sources and said first valve means to connect said first and second sources alternately to said first valve means, common driving means for said first and second valve means including speed reducing means to drive said second valve means at half the speed of said first valve means, means operatively associated with said chamber to produce an electrical signal in response to the density of the fog produced in said chamber for each pressure, electrical circuit means coupled to said last named means to measure selectively the magnitude of said electrical signal for each pressure, and means coupled to said measuring means for indicating the difference in magnitude of said signals as an indication of the difference in density of said fogs as an index of the nuclei concentration in the desired size range.

6. In a condensation nuclei detecting apparatus, the combination comprising a chamber adapted to hold nuclei bearing gaseous samples under pressure, first rotary valve means coupled to said chamber to introduce and expand samples periodically in said chamber, first and second sources of different lower pressure, a second rotary valve means coupled between said sources and said first rotary valve means and rotating at one-half the speed thereof to connect said first and second sources alternately to said first valve means, common driving means for said first and second means, means operatively associated with said chamber to produce an electrical signal in response to the density of fog produced in said chamber for each pressure, first and second circuit means to measure respectively the magnitude of the electrical signals for each pressure, means to couple said signal producing means selectively to said first and second measuring means and means coupled to said measuring means for indicating the difference in magnitude of said signals as an indication of the difference in density of said fogs.

7. In a condensation nuclei detecting apparatus, the combination comprising a chamber adapted to hold nuclei bearing gaseous samples under pressure, first rotary valve means coupled to said chamber to introduce and expand samples periodically in said chamber, first and second sources of different lower pressure, a second rotary valve means coupled between said sources and said first rotary valve means and rotating at one-half the speed thereof to connect said first and second sources alternately to said first valve means, common driving means for said first and second valve means, means operatively associated with said chamber to produce an electrical signal in response to the density of fog produced for each pressure, first and second means to measure respectively the magnitude of the electrical signals for each pressure, means actuated by said common driving means to couple said signal producing means alternately to said first and second measuring means depending on which pressure source is coupled to said first valve, and means coupled to said measuring means for indicating the difference in magnitude of said signals as an indication of the difference in density of said fogs.

8. In a continuous condensation nuclei detecting apparatus for determining the nuclei concentration in a desired range of sizes, the combination comprising a chamber means adapted to hold nuclei bearing gaseous samples introduced periodically into said chamber, means coupled to said chamber means for expanding successive samples by different degrees of expansion, and means operatively associated with said chamber means for producing electrical outputs proportional to the density of the fog produced by the expansion of the individual samples, and electrical circuit means coupled to said last named means for continually subtracting the electrical output for successive samples to determine the difference in density of the fog for successive samples due to the different degrees of expansion to indicate the nuclei concentration in the desired size range.

9. In a continuous condensation nuclei detecting apparatus for determining the nuclei concentration in a desired range of sizes, the combination comprising chamber means adapted to hold nuclei bearing gaseous samples, means coupled to said chamber means to introduce samples periodically into said chamber, means coupled to said chamber means for expanding successive samples by different degrees of expansion, and means operatively associated with said chamber means for producing electrical outputs proportional to the density of the fog produced by the expansion of the individual samples, and electrical circuit means coupled to said last named means for continually subtracting the electrical output for successive samples to determine the difference in density of the fog for successive samples due to the different degrees of expansion to indicate the nuclei concentration in the desired size range.

10. In a continuous condensation nuclei detecting apparatus for determining the nuclei concentration in a predetermined range of sizes, the combination comprising chamber means adapted to hold nuclei bearing gaseous samples, first valve means coupled to said chamber means and adapted to introduce samples into said chamber periodically, means including a second valve means coupled to said chamber for expanding successive samples in said chamber by different degrees of expansion to produce condensation about different ranges of nuclei sizes, said ranges being partially overlapping, means operatively associated with said chamber means for producing electrical outputs proportional to the density of the fog produced in the individual samples, and circuit means coupled to said last named means for continually subtracting the electrical outputs for successive samples to determine the difference in the densities of the fog for successive samples to indicate the nuclei concentration in a discrete range of sizes.

11. In a continuous size selective condensation nuclei detecting apparatus, the combination comprising a chamber means adapted to hold nuclei bearing samples under pressure, first valve means coupled to said chamber means to introduce samples into said chamber periodically, means coupled to said first valve means for expanding successive samples by different degrees of expansion including a first source of lower pressure, a second source of lower pressure, valve means coupled between said sources and said chamber means to couple said first and second sources alternately to said chamber, and means operatively associated with said chamber means for producing electrical outputs proportional to the density of the droplet clouds formed in the individual samples, and electrical circuit means coupled to said last named means for continually subtracting the electrical outputs for samples subjected to different degrees of expansion to indicate the nuclei concentration in the selected size range.

References Cited in the file of this patent

UNITED STATES PATENTS

| | | |
|---|---|---|
| 1,969,626 | Simon | Aug. 7, 1934 |
| 1,971,443 | Exton | Aug. 28, 1934 |
| 2,032,746 | Grant | Mar. 3, 1936 |
| 2,076,554 | Drinker | Apr. 13, 1937 |
| 2,291,776 | Wagner | Aug. 4, 1942 |
| 2,299,457 | Cahusac | Oct. 20, 1942 |
| 2,620,385 | Grant | Dec. 2, 1952 |
| 2,684,008 | Vonnegut | July 20, 1954 |

FOREIGN PATENTS

| | | |
|---|---|---|
| 406,648 | Great Britain | Feb. 26, 1934 |

OTHER REFERENCES

Cloud Chamber for Counting Nuclei in Aerosols, by Bernard G. Saunders, The Review of Scientific Instruments, vol. 27, No. 5, May 1956; pages 273 through 277 are pertinent.